US012511198B2

(12) United States Patent
Gupta et al.

(10) Patent No.: US 12,511,198 B2
(45) Date of Patent: Dec. 30, 2025

(54) DATA TRANSFER TIME ESTIMATION

(71) Applicant: Dell Products L.P., Round Rock, TX (US)

(72) Inventors: Kaushik Gupta, Pune (IN); Shiv S. Kumar, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/646,172

(22) Filed: Apr. 25, 2024

(65) Prior Publication Data

US 2025/0335305 A1 Oct. 30, 2025

(51) Int. Cl.
*G06F 11/14* (2006.01)

(52) U.S. Cl.
CPC ...... *G06F 11/1458* (2013.01); *G06F 2201/80* (2013.01)

(58) Field of Classification Search
CPC ......................... G06F 11/1458; G06F 2201/80
See application file for complete search history.

(56) References Cited

U.S. PATENT DOCUMENTS 10,083,094 B1 * 9/2018 Thomas .............. G06F 11/1466
2024/0427669 A1 * 12/2024 Gottipati ............ G06F 11/1464

* cited by examiner

*Primary Examiner* — Loc Tran
(74) *Attorney, Agent, or Firm* — Amin, Turocy & Watson, LLP

(57) ABSTRACT

A system can maintain respective numbers of changed bytes for respective backup paths of a file system, which indicate how many bytes have changed since respective most-recent backups of the respective backup paths. The system can, while performing a backup of a backup path of the respective backup paths, for respective tasks of the backup, determine respective amounts of time spent backing up respective files associated with the respective tasks, and respective file sizes of the respective files, determine a mean time to transfer a byte based on the respective amounts of time spent backing up the respective files, and the respective file sizes, determine an estimated time of completing the backup based on the mean time to transfer a byte and the number of changed bytes for the backup path, and store an indication of the estimated time of completing the backup.

20 Claims, 11 Drawing Sheets

400

402 404

| Id | Path | TBTT |
|---|---|---|
| 1 | /home/abel | 8192 |
| 2 | /home/abel/music | 4096 |
| 3 | /home/baker | 2048 |

| Id | Path | TBTT |
|---|---|---|
| 1 | /home/abel | 10240 |
| 2 | /home/abel/music | 6144 |
| 3 | /home/baker | 2048 |

FIG. 5

```
                            ┌─────┐
                            │ 602 │
                            └──┬──┘
                               ▼
┌──────────────────────────────────────────────────────────────────────┐
│ MAINTAINING RESPECTIVE NUMBERS OF CHANGED BYTES FOR RESPECTIVE BACKUP│
│ PATHS OF A FILE SYSTEM, WHEREIN THE RESPECTIVE NUMBERS OF CHANGED    │
│ BYTES INDICATE HOW MANY BYTES HAVE CHANGED SINCE RESPECTIVE          │
│ MOST-RECENT BACKUPS OF THE RESPECTIVE BACKUP PATHS 604               │
└──────────────────────────────────┬───────────────────────────────────┘
                                   ▼
┌──────────────────────────────────────────────────────────────────────┐
│ PERFORMING A BACKUP OF A BACKUP PATH OF THE RESPECTIVE BACKUP PATHS, │
│ WHEREIN THE BACKUP PATH IS ASSOCIATED WITH A NUMBER OF CHANGED       │
│ BYTES OF THE RESPECTIVE NUMBERS OF CHANGED BYTES 606                 │
└──────────────────────────────────┬───────────────────────────────────┘
                                   ▼
┌──────────────────────────────────────────────────────────────────────┐
│ FOR RESPECTIVE TASKS OF THE BACKUP, DETERMINING RESPECTIVE AMOUNTS   │
│ OF TIME SPENT BACKING UP RESPECTIVE FILES ASSOCIATED WITH THE        │
│ RESPECTIVE TASKS, AND RESPECTIVE FILE SIZES OF THE RESPECTIVE FILES  │
│ 608                                                                  │
└──────────────────────────────────┬───────────────────────────────────┘
                                   ▼
┌──────────────────────────────────────────────────────────────────────┐
│ DETERMINING A MEAN TIME TO TRANSFER A BYTE BASED ON THE RESPECTIVE   │
│ AMOUNTS OF TIME SPENT BACKING UP THE RESPECTIVE FILES, AND THE       │
│ RESPECTIVE FILE SIZES 610                                            │
└──────────────────────────────────┬───────────────────────────────────┘
                                   ▼
┌──────────────────────────────────────────────────────────────────────┐
│ DETERMINING AN ESTIMATED TIME OF COMPLETING THE BACKUP BASED ON THE  │
│ MEAN TIME TO TRANSFER A BYTE AND THE NUMBER OF CHANGED BYTES 612     │
└──────────────────────────────────┬───────────────────────────────────┘
                                   ▼
┌──────────────────────────────────────────────────────────────────────┐
│ STORING AN INDICATION OF THE ESTIMATED TIME OF COMPLETING THE        │
│ BACKUP 614                                                           │
└──────────────────────────────────┬───────────────────────────────────┘
                                   ▼
                               ┌─────┐
                               │ 616 │
                               └─────┘
```

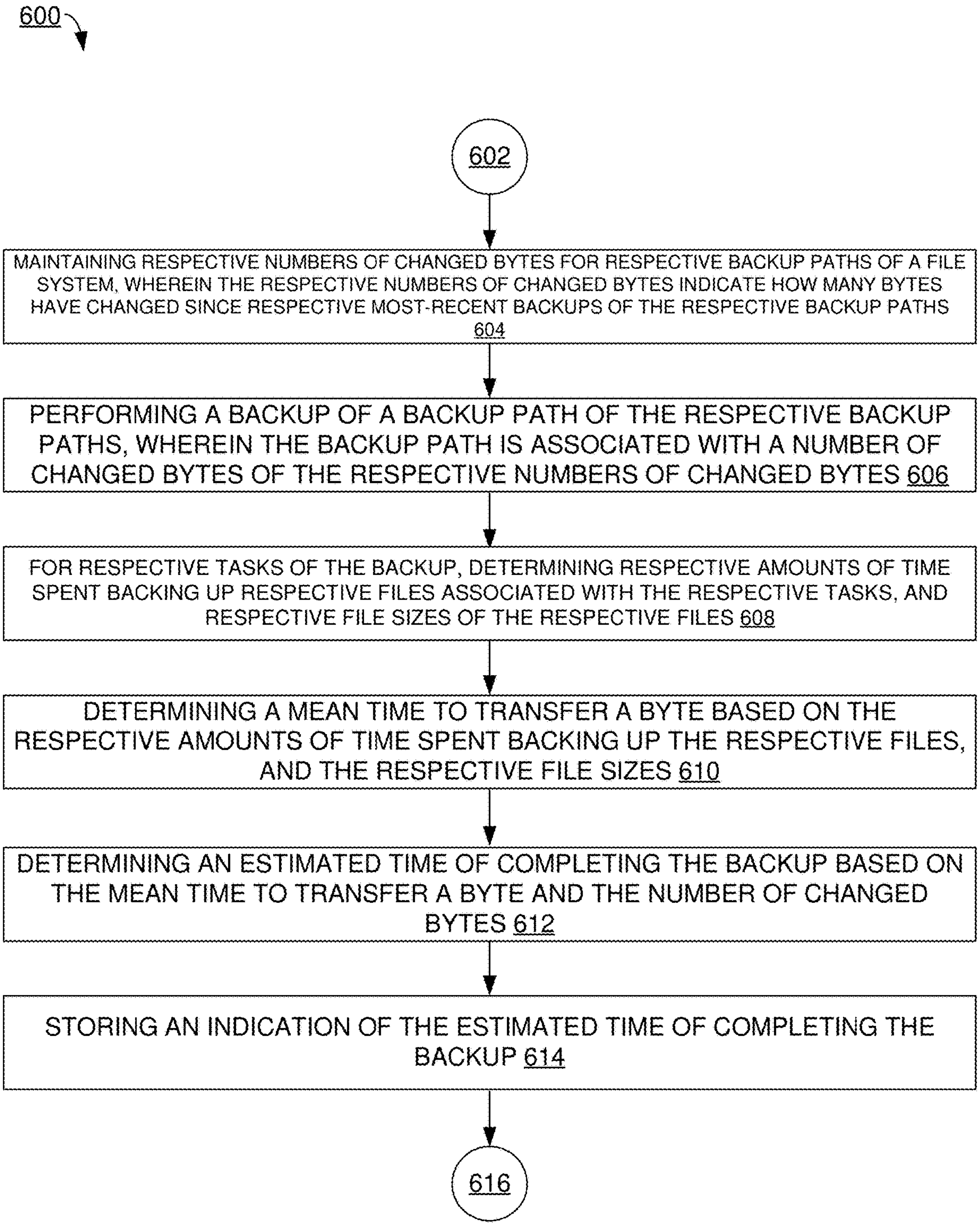

BASED ON PERFORMING A FILE OPERATION ON A FILE PATH, AND BASED ON DETERMINING THAT THE BACKUP PATH COMPRISES A SUBSTRING OF THE FILE PATH, INCREASING THE NUMBER OF CHANGED BYTES BY A DATA SIZE ASSOCIATED WITH THE FILE OPERATION 904

↓

WHEREIN THE FILE OPERATION IS A FIRST FILE OPERATION, WHEREIN THE FILE PATH IS A FIRST FILE PATH, WHEREIN THE DATA SIZE IS A FIRST DATA SIZE, AND BASED ON PERFORMING A SECOND FILE OPERATION ON THE FILE PATH OR A SECOND FILE PATH, WHEREIN THE FILE OPERATION IS TO DELETE A FILE, REFRAINING FROM MODIFYING THE NUMBER OF CHANGED BYTES BY A SECOND DATA SIZE ASSOCIATED WITH THE FILE OPERATION 906

↓

WHEREIN THE FILE OPERATION IS A FIRST FILE OPERATION, WHEREIN THE FILE PATH IS A FIRST FILE PATH, WHEREIN THE DATA SIZE IS A FIRST DATA SIZE, AND BASED ON PERFORMING A SECOND FILE OPERATION ON THE FILE PATH OR A SECOND FILE PATH, WHEREIN THE FILE OPERATION IS TO PERFORM A METADATA UPDATE ON A FILE, REFRAINING FROM MODIFYING THE NUMBER OF CHANGED BYTES BY A SECOND DATA SIZE ASSOCIATED WITH THE FILE OPERATION 908

↓

(910)

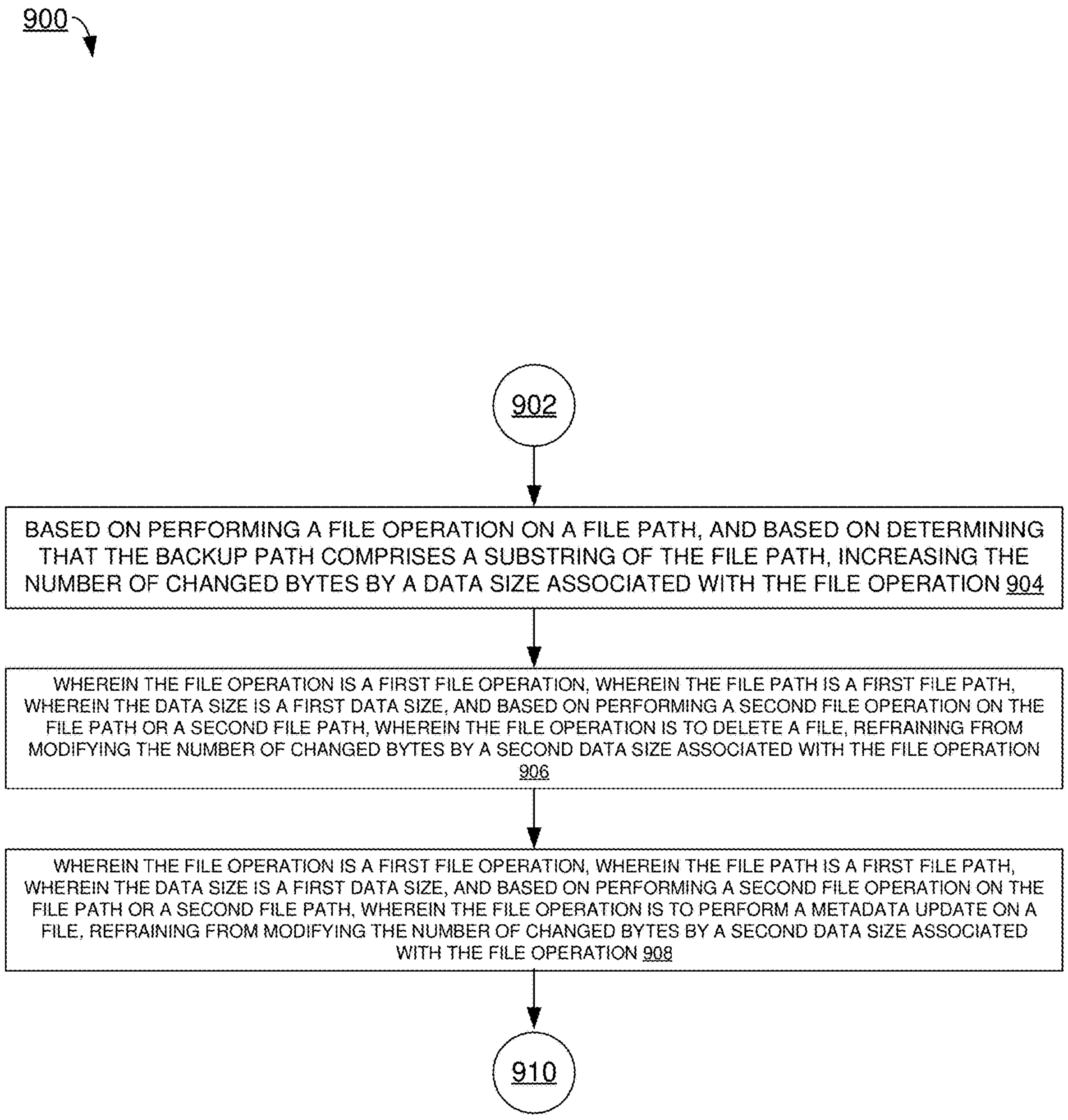

FIG. 9

DATA TRANSFER TIME ESTIMATION

BACKGROUND

Computer data can be transferred between computers, such as part of performing a backup of computer data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain respective numbers of changed bytes for respective backup paths of a file system, wherein the respective numbers of changed bytes indicate how many bytes have changed since respective most-recent backups of the respective backup paths. The system can, while performing a backup of a backup path of the respective backup paths, wherein the backup path is associated with a number of changed bytes of the respective numbers of changed bytes, for respective tasks of the backup, determine respective amounts of time spent backing up respective files associated with the respective tasks, and respective file sizes of the respective files, determine a mean time to transfer a byte based on the respective amounts of time spent backing up the respective files, and the respective file sizes, determine an estimated time of completing the backup based on the mean time to transfer a byte and the number of changed bytes, and store an indication of the estimated time of completing the backup.

An example method can comprise performing, by a system comprising at least one processor, a backup of a backup path, wherein the backup path is associated with a number of changed bytes that indicates how many bytes have changed since a most-recent backup of the backup paths. The method can further comprise, for respective tasks of the backup, determining, by the system, respective amounts of time spent backing up respective files associated with the respective tasks, and respective file sizes of the respective files. The method can further comprise determining, by the system, a mean time to transfer a byte based on the respective amounts of time spent backing up the respective files, and the respective file sizes. The method can further comprise determining, by the system, an approximate time of completing the backup based on the mean time to transfer a byte and the number of changed bytes. The method can further comprise storing, by the system, an indication of the approximate time of completing the backup.

An example non-transitory computer-readable medium can comprise instructions that, in response to execution, cause a system comprising a processor to perform operations. These operations can comprise receiving a request to perform a backup a backup path, wherein the backup path is associated with an amount of changed data that indicates how much data has changed since a most-recent backup of the backup paths. These operations can further comprise, for respective files of the backup and responsive to receiving the request, determining respective amounts of time spent backing up the respective files, and respective file sizes of the respective files. These operations can further comprise determining a projected time of completing the backup based on the respective amounts of time spent backing up the respective files, the respective file sizes, and the amount of changed data. These operations can further comprise storing an indication of the projected time of completing the backup.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example database that can facilitate data transfer time estimation, in accordance with an embodiment of this disclosure;

FIG. 5 illustrates another example database that can facilitate data transfer time estimation, in accordance with an embodiment of this disclosure;

FIG. 6 illustrates an example process flow that can facilitate data transfer time estimation, in accordance with an embodiment of this disclosure;

FIG. 9 illustrates another example process flow that can facilitate data transfer time estimation, in accordance with an embodiment of this disclosure;

DETAILED DESCRIPTION

Overview

Figure 1:
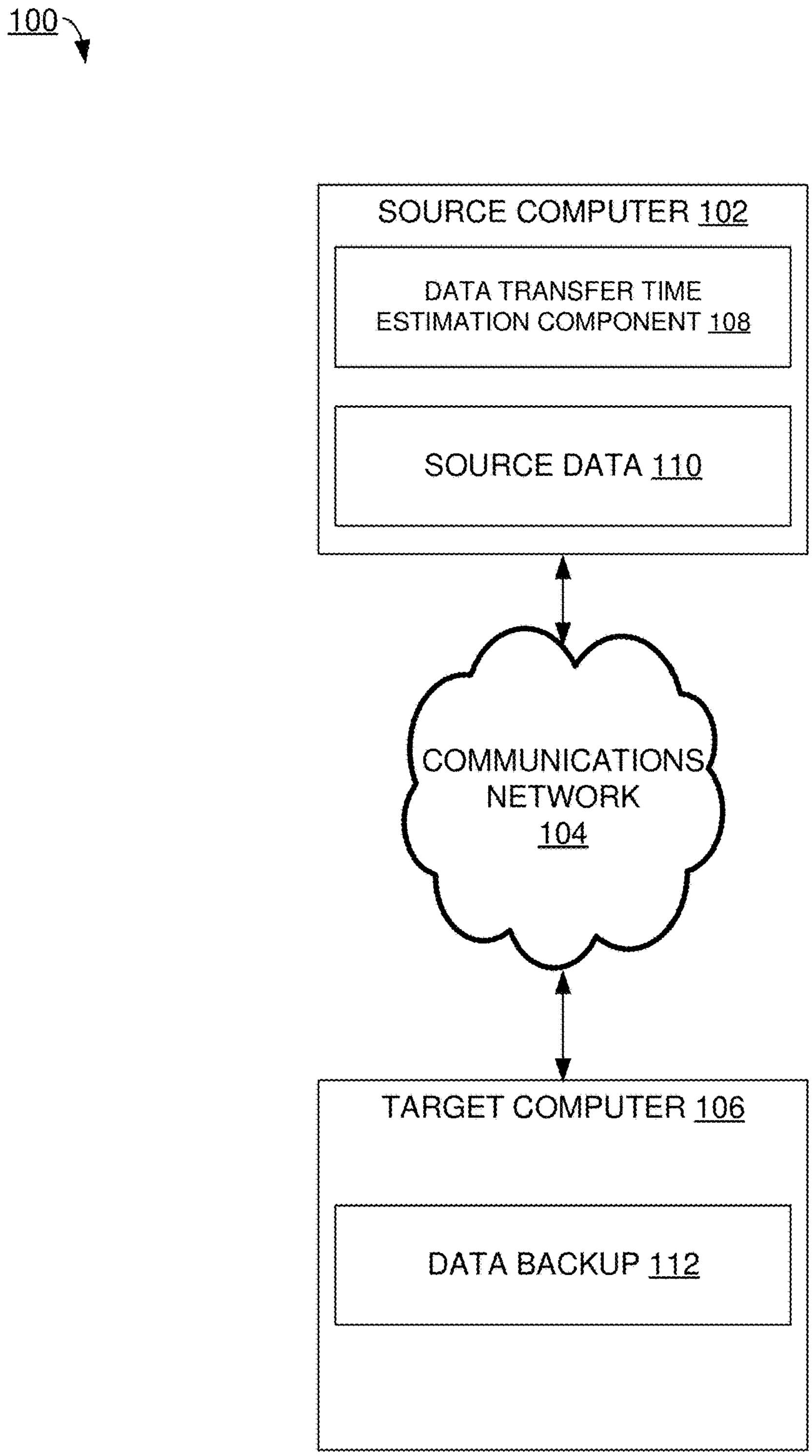
FIG. 1 illustrates an example system architecture that can facilitate data transfer time estimation, in accordance with an embodiment of this disclosure.

Determining when a computing job will complete (sometimes referred to as an estimated time of arrival (ETA)) can be requested. The present techniques can be applied to determining an ETA for a backup job. While the examples herein generally involve data backup, it can be appreciated that they can generally be applied to data transfer.

An ETA determination for this type of job can be based on a total number of bytes to be transferred. In some implementations, for an estimate, a backup job can be performed in an assessment mode, where a difference (in a set of data between two timestamps) can be performed for each file. Based on a size of a region for each difference, an estimate can be made for a total number of bytes to be transferred.

A problem with this approach can be that an assessment mode itself can take a long time, thus impacting a total time for a job to complete (where ETA is expected).

This problem with assessment mode can be addressed via the present techniques by including total bytes to transfer (TBTT) as part of a dataset that is being transferred.

TBTT capabilities can be used as follows. The backup job can work on datasets (which can comprise a snapshot and corresponding metadata). The backup job (for incremental jobs) can send the data represented by the difference between two snapshots.

When a dataset is created, a TBTT for the base path can be read from the database and added to the metadata of the dataset. After this, the TBTT in the database for the basepath can be marked as 0.

In this manner, if a backup job moves an old dataset, it can have the TBTT. Likewise, multiple jobs can move the same dataset (e.g., content distribution or chaining), and it can be that, as long as the dataset exists, the TBTT can also exist.

In some examples, once the backup job identifies the dataset it wants to transfer, it can read the TBTT from the dataset and use it to determine the ETA.

Data can be collected from historical jobs as follows. When a job runs, periodically (e.g., every Nth task) a determination can be made of time_to_transfer_a_byte=(task_end_time-task_start_time)/bytes_transferred By doing an average of the tasks for which a time_to_transfer_a_byte is determined, mean_time_to_trasnfer_a_byte (MTT) can be determined for a given job.

It can be that tasks that are paused mid-way through are disregarded for a MTT determination. An average MTT can then be determined for a recent number of jobs (e.g., the last five jobs).

For an upcoming job, a determination for ETA can be made as:

ETA=TBTT*Avg. MTT.

As a job progresses, the tasks can complete and decrease the bytes_transferred from the total_bytes_to_transfer, thus decreasing the ETA.

Also, as the job progresses and the MTT for the running job is determined, the average MTT can be updated, and then the ETA can be correspondingly updated.

In some examples, an average time to send a byte of data (or other unit of data) can be determined from historical jobs. This, and the total changed size of a backup (TBTT) can be used to determine an ETA for a job, where it can be the product of the average time to send a byte and TBTT.

In some examples, a task can comprise a process or a thread, and multiple tasks can be implemented to perform a backup. In an example, task-1 transfers 3 small files, and task-2 and task-3 transfer one file each. As each task completes, it can decrease the total time that that completed task ran from the expected time.

Example Architectures, Etc.

FIG. 1 illustrates an example system architecture 100 that can facilitate data transfer time estimation, in accordance with an embodiment of this disclosure.

System architecture 100 comprises source computer 102, communications network 104, and target computer 106. In turn, source computer 102 comprises data transfer time estimation component 108 and source data 110, and target computer 106 comprises data backup 112.

System architecture 100 presents one logical example of implementing the present techniques, and it can be appreciated that there can be other example architectures.

Figure 11:
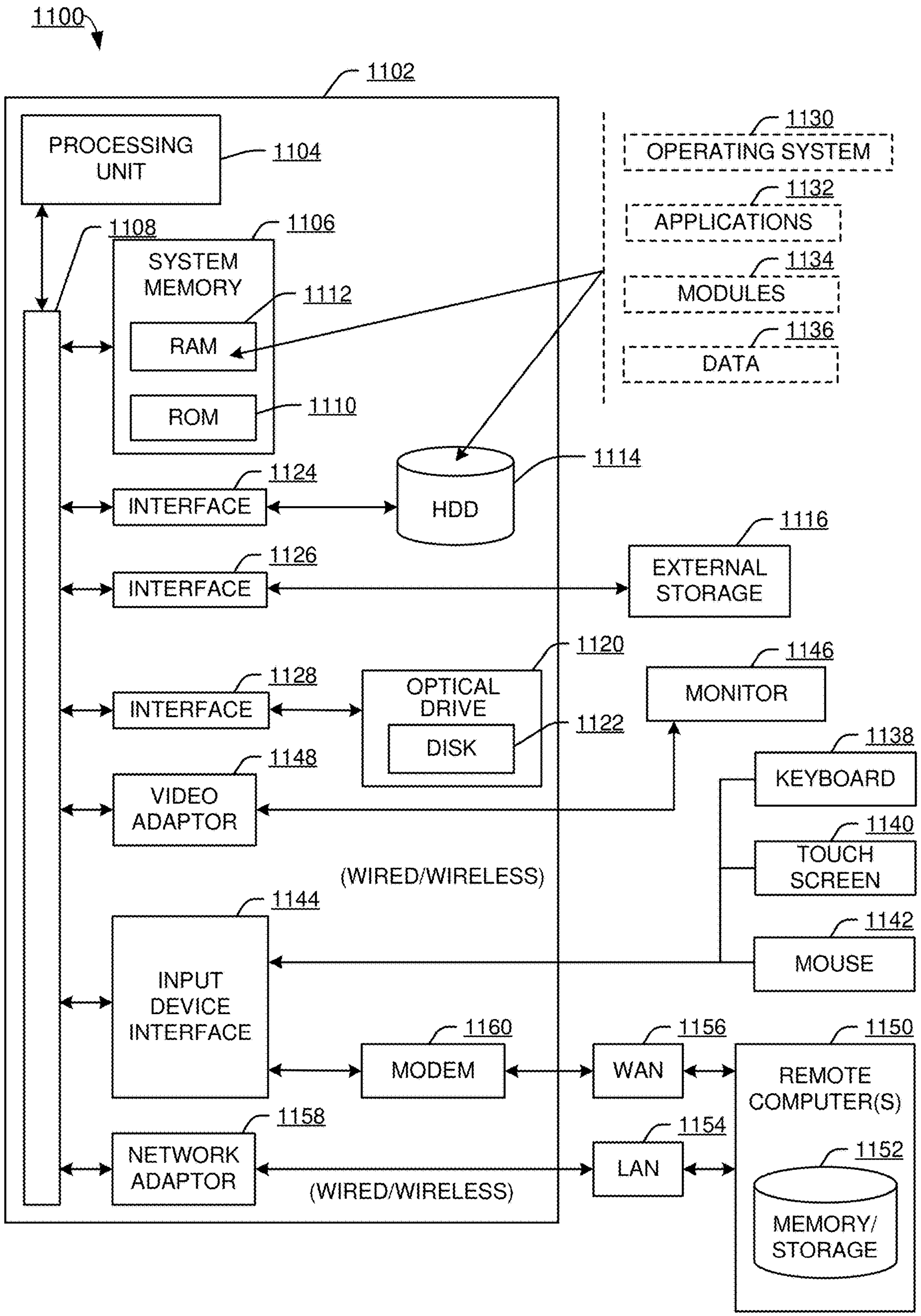
FIG. 11 illustrates an example block diagram of a computer operable to execute an embodiment of this disclosure.

Each of source computer 102 and/or target computer 106 can be implemented with part(s) of computing environment 1100 of FIG. 11. Communications network 104 can comprise a computer communications network, such as the Internet, or an intranet.

In some examples, data transfer time estimation component 108 can facilitate data transfer time estimation of source data 110 as it is backed up to data backup 112 via being transferred across communications network 104.

Figure 2:
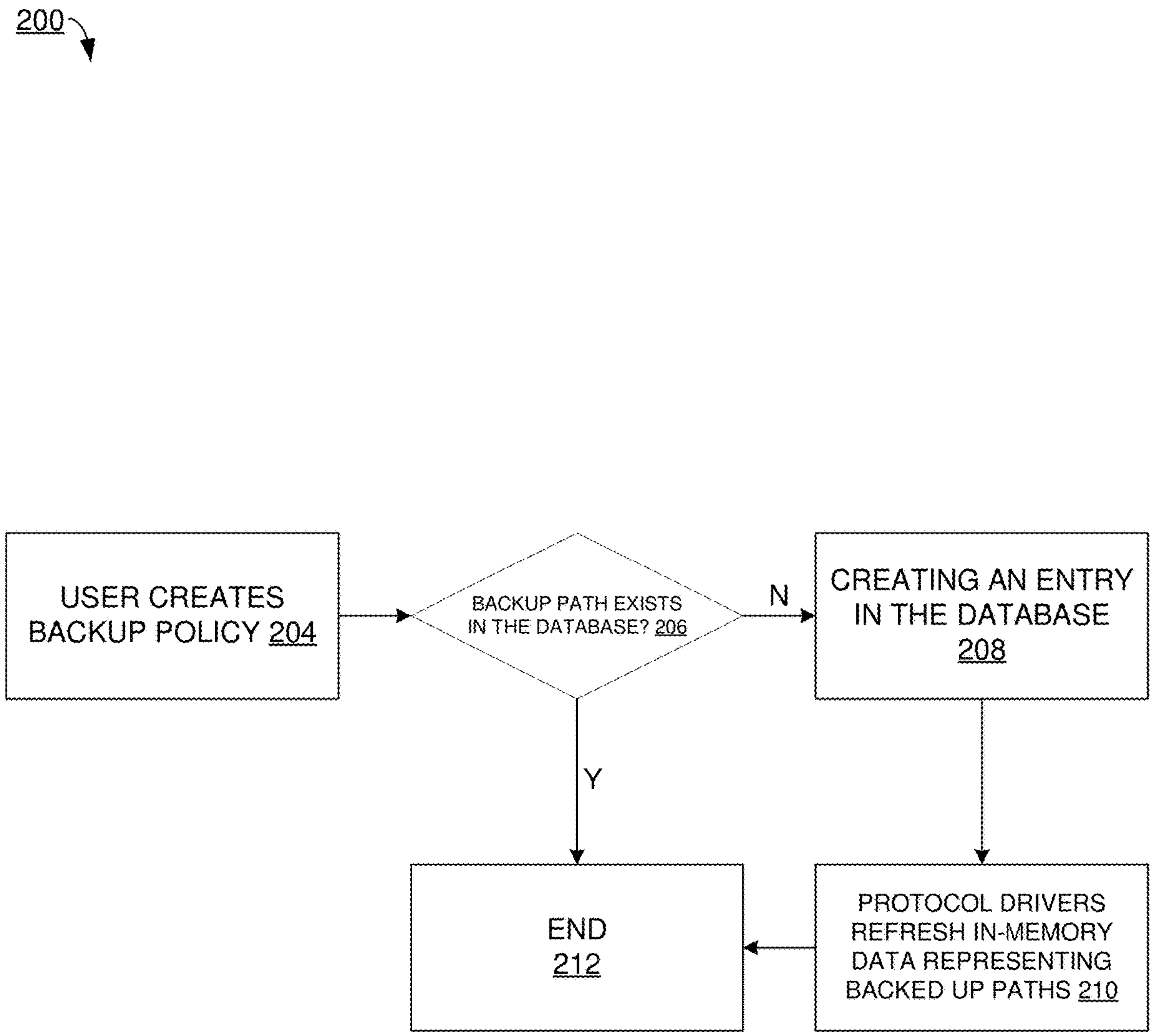
FIG. 2 illustrates an example process flow for creating a backup policy, and that can facilitate data transfer time estimation, in accordance with an embodiment of this disclosure.
Figure 3:
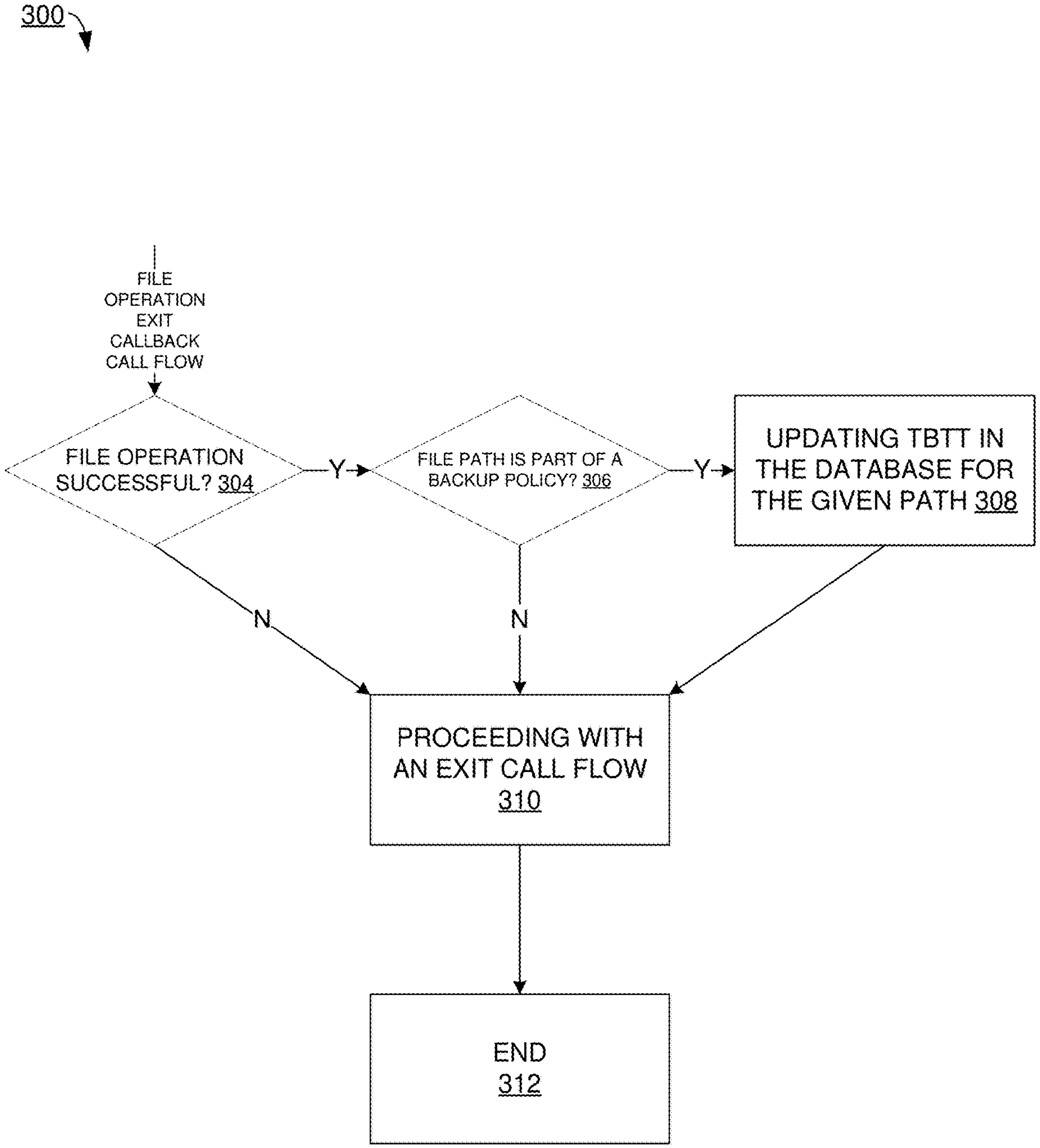
FIG. 3 illustrates an example process flow for a file operation exit callback, and that can facilitate data transfer time estimation, in accordance with an embodiment of this disclosure.

In some examples, data transfer time estimation component 108 can implement part(s) of the process flows of FIGS. 2-3 and/or 6-10 to implement data transfer time estimation.

It can be appreciated that system architecture 100 is one example system architecture for data transfer time estimation, and that there can be other system architectures that facilitate data transfer time estimation.

FIG. 2 illustrates an example process flow 200 for creating a backup policy, and that can facilitate data transfer time estimation, in accordance with an embodiment of this disclosure. In some examples, one or more embodiments of process flow 200 can be implemented by data transfer time estimation component 108 of FIG. 1, or computing environment 1100 of FIG. 11.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 300 of FIG. 3, process flow 600 of FIG. 6, process flow 700 of FIG. 7, process flow 800 of FIG. 8, process flow 900 of FIG. 9, and/or process flow 1000 of FIG. 10.

TBTT can be generated as follows. For each backup policy, a source-base-path can be added to a separate database (which can be referred to as backed-paths-DB).

When backed-paths-DB is updated, corresponding protocol drivers can receive a SIGHUP message and refresh a list of in-memory backed paths (where these paths can be referred to by the protocol drivers in processing a file operation (FOP)).

Process flow 200 begins with 202, and moves to operation 204.

Operation 204 depicts user creates backup policy.

After operation 204, process flow 200 moves to operation 206.

Operation 206 depicts determining whether the backup path exists in the database.

Where it is determined in operation 206 that the backup path exists in the database, then process flow 200 moves to 212, where process flow 200 ends. Instead, where it is determined in operation 206 that the backup path does not exist in the database, then process flow 200 moves to 208.

Operation 208 is reached from operation 206 where it is determined that the backup path exists in the database. Operation 208 depicts creating an entry in the database.

Operation 210 depicts protocol drivers refresh in-memory data representing backed up paths.

After operation 204, process flow 200 moves to 212, where process flow 200 ends.

FIG. 3 illustrates an example process flow 300 for a file operation exit callback, and that can facilitate data transfer time estimation, in accordance with an embodiment of this disclosure. In some examples, one or more embodiments of process flow 300 can be implemented by data transfer time estimation component 108 of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 200 of FIG. 2, process flow 600 of FIG. 6, process flow 700 of FIG. 7, process flow 800 of FIG. 8, process flow 900 of FIG. 9, and/or process flow 1000 of FIG. 10.

It can be that each file operation has a file path associated with it. If a path in the backed-paths-DB is a substring of the file operation's file path, a database entry can be made against the base path stating the size of the file operation.

It can be that delete and metadata update file operations result in backup work, but, in some examples, these do not have enough data involved to affect an approximate ETA so are disregarded with respect to approximating ETA.

TBTT can be updated for each FOP in a given directory. TBTT can be cleared when requested by the backup job. It can be that TBTT does not indicate a total size of a directory (like with quotas). Rather, TBTT can indicate a total number of bytes written since a last time it was cleared.

A database entry can be made by a protocol driver in an exit context.

It can be that the present techniques are enabled when a user uses a backup job and indicates wanting to know the backup job's ETA. It can be that, otherwise, the present techniques for determining TBTT are not exercised.

It can be that a database entry is made by a protocol driver in an exit context.

Process flow 300 begins with 302, and moves to operation 304.

Operation 304 depicts determining whether the file operation was successful.

Where it is determined in operation 304 that the file operation was successful, process flow 300 moves to operation 306. Instead, where it is determined in operation 304 that the file operation was not successful, process flow 300 moves to operation 310.

Operation 306 is reached from operation 304 where it is determined that the file operation is successful. Operation 306 depicts determining whether the file path is part of a backup policy.

Where it is determined in operation 306 that the file path part is part of a backup policy, process flow 300 moves to operation 308. Instead, where it is determined in operation 306 that the file path part is not part of a backup policy, process flow 300 moves to operation 310.

Operation 308 is reached from operation 306 where it is determined that the file path part is part of a backup policy. Operation 308 depicts updating TBTT in the database for the given path.

Operation 310 is reached from operation 304 where it is determined that the file operation was not successful; from operation 306 where it is determined that the file path is not part of a backup policy; or from operation 308. Operation 310 depicts proceeding with an exit call flow.

After operation 310, process flow 300 moves to 312, where process flow 300 ends.

FIG. 4 illustrates an example database 400 that can facilitate data transfer time estimation, in accordance with an embodiment of this disclosure. In some examples, part(s) of database 200 can be used by part(s) of system architecture 100 of FIG. 1 to facilitate creating a backup policy.

Database 400 comprises rows 402 and columns 404. Each row of rows 402 can identify a database entry, and for an entry, columns 404 can identify an ID, a file path, and a TBTT (which can be expressed in bytes).

Consider a scenario where a 2 kilobyte (KB) write comes to /home/abel/music/latest. Two paths—/home/abel and /home/abel/music—can be updated. This can facilitate nested back up paths.

After this 2 KB write to/home/abel/music/latest, database 400 can look like database 500 (which comprises rows 502 and columns 504).

FIG. 5 illustrates another example database 500 that can facilitate data transfer time estimation, in accordance with an embodiment of this disclosure. In some examples, part(s) of database 500 can be used by part(s) of system architecture 100 of FIG. 1 to facilitate creating a backup policy.

Database 500 comprises rows 502 and columns 504 (which can be similar to comprises rows 402 and columns 404 of FIG. 4).

Example Process Flows

FIG. 6 illustrates an example process flow 600 that can facilitate data transfer time estimation, in accordance with an embodiment of this disclosure. In some examples, one or more embodiments of process flow 600 can be implemented by data transfer time estimation component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 200 of FIG. 2, process flow 300 of FIG. 3, process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts maintaining respective numbers of changed bytes for respective backup paths of a file system, wherein the respective numbers of changed bytes indicate how many bytes have changed since respective most-recent backups of the respective backup paths. That is, TBTT information can be stored along with backup data.

In some examples, the respective backup paths are stored in a data store, and operation 604 comprises, based on creation of a backup policy that identifies the backup path, and based on determining that the backup path does exist in the data store, refraining from causing a protocol driver that is configured to perform file system operations on the file system to refresh an in-memory data structure that represents the respective backup paths.

In some examples, operation 604 comprises, based on determining that an exit callback call flow of a file operation indicates that the file operation was unsuccessful, refraining from updating the respective numbers of changed bytes for the respective backup paths.

In some examples, operation 604 comprises, based on determining that an exit callback call flow of a file operation indicates that the file operation was successful, and based on determining that the file operation omits a reference to any of the respective backup paths, refraining from updating the respective numbers of changed bytes for the respective backup paths.

In some examples, operation 604 comprises, based on determining that an exit callback call flow of a file operation indicates that the file operation was successful, and based on determining that the file operation identifies the backup path of the respective backup paths, updating the number of changed bytes that corresponds to the backup path.

That is, operations similar to those depicted with respect to process flow 300 of FIG. 3 can be implemented to update a database to reflect an amount of changed data for a backup path.

After operation 604, process flow 600 moves to operation 606.

Operation 606 depicts performing a backup of a backup path of the respective backup paths, wherein the backup path is associated with a number of changed bytes of the respective numbers of changed bytes. That is, a backup can be initiated, and in some examples, operations 608-614 can be performed based on performing operation 606.

After operation 606, process flow 600 moves to operation 608.

Operation 608 depicts, for respective tasks of the backup, determining respective amounts of time spent backing up respective files associated with the respective tasks, and respective file sizes of the respective files. That is, an amount of time to transfer a particular file can be determined.

After operation 608, process flow 600 moves to operation 610.

Operation 610 depicts determining a mean time to transfer a byte based on the respective amounts of time spent backing up the respective files, and the respective file sizes. That is a MTTB can be determined based on the information of operation 608.

After operation 610, process flow 600 moves to operation 612.

Operation 612 depicts determining an estimated time of completing the backup based on the mean time to transfer a byte and the number of changed bytes. That is, an ETA can be determined based on the information in operation 610.

After operation 612, process flow 600 moves to operation 614.

Operation 614 depicts storing an indication of the estimated time of completing the backup.

After operation 614, process flow 600 moves to 616, where process flow 600 ends.

Figure 7:
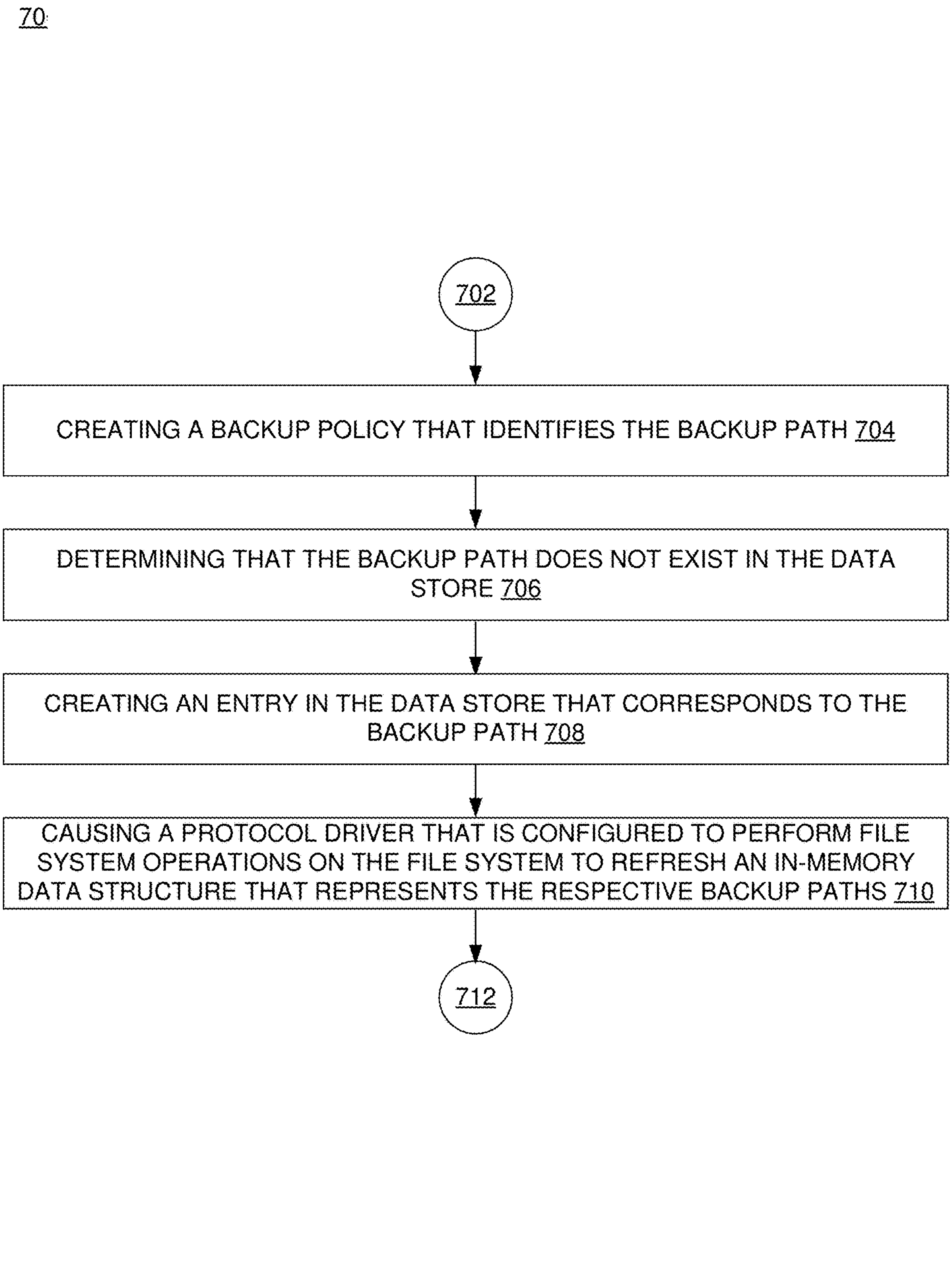
FIG. 7 illustrates another example process flow that can facilitate data transfer time estimation, in accordance with an embodiment of this disclosure.

FIG. 7 illustrates an example process flow 700 that can facilitate data transfer time estimation, in accordance with an embodiment of this disclosure. In some examples, one or more embodiments of process flow 700 can be implemented by data transfer time estimation component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 200 of FIG. 2, process flow 300 of FIG. 3, process flow 600 of FIG. 6, process flow 800 of FIG. 8, process flow 900 of FIG. 9, and/or process flow 1000 of FIG. 10.

In process flow 700, respective backup paths can be stored in a data store.

Process flow 700 begins with 702, and moves to operation 704.

Operation 704 depicts creating a backup policy that identifies the backup path. This can be implemented in a similar manner as operation 204 of FIG. 2.

After operation 704, process flow 700 moves to operation 706.

Operation 706 depicts determining that the backup path does not exist in the data store. This can be implemented in a similar manner as operation 206 of FIG. 2.

In some examples, operations 708-710 can be performed based on creation of a backup policy that identifies the backup path, and based on determining that the backup path does not exist in the data store.

After operation 706, process flow 700 moves to operation 708.

Operation 708 depicts creating an entry in the data store that corresponds to the backup path. This can be implemented in a similar manner as operation 208 of FIG. 2.

After operation 708, process flow 700 moves to operation 710.

Operation 710 depicts causing a protocol driver that is configured to perform file system operations on the file system to refresh an in-memory data structure that represents the respective backup paths. This can be implemented in a similar manner as operation 210 of FIG. 2.

In some examples, causing the protocol driver that is configured to perform file system operations on the file system to refresh the in-memory data structure that represents the respective backup paths is performed based on sending a signal hang up message to the protocol driver.

After operation 710, process flow 700 moves to 712, where process flow 700 ends.

Figure 8:
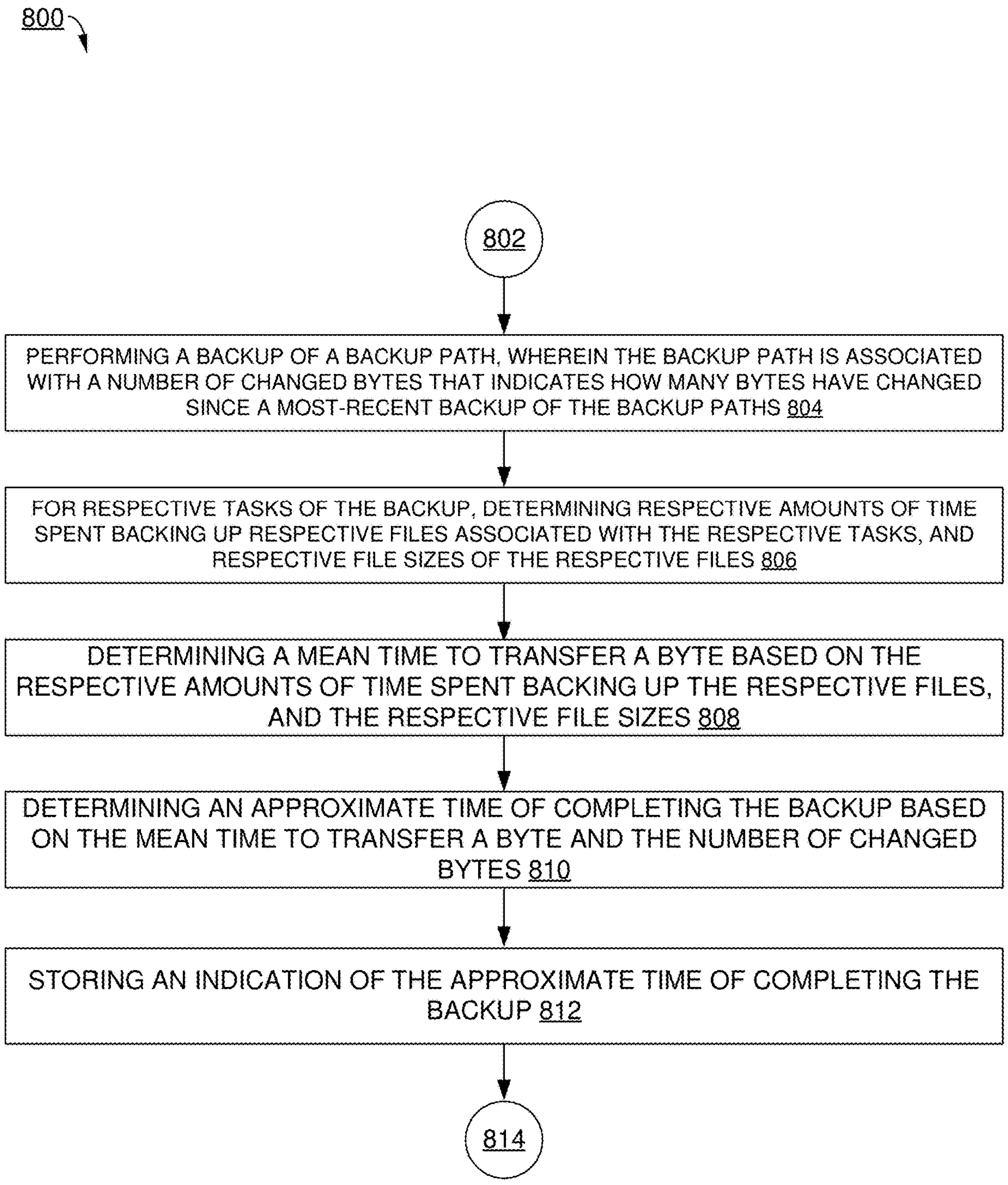
FIG. 8 illustrates another example process flow that can facilitate data transfer time estimation, in accordance with an embodiment of this disclosure.

FIG. 8 illustrates an example process flow 800 that can facilitate data transfer time estimation, in accordance with an embodiment of this disclosure. In some examples, one or more embodiments of process flow 800 can be implemented by data transfer time estimation component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 300 of FIG. 3, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts performing a backup of a backup path, wherein the backup path is associated with a number of changed bytes that indicates how many bytes have changed since a most-recent backup of the backup paths. In some examples, operation 804 can be implemented in a similar manner as operation 606 of FIG. 6.

In some examples, operation 804 comprises creating a stored value that indicates the number of changed bytes before determining to perform the backup. That is, the amount of changed data can be performed prior to initiating a backup, rather than as a result of initiating a backup.

After operation 804, process flow 800 moves to operation 806.

Operation 806 depicts, for respective tasks of the backup, determining respective amounts of time spent backing up respective files associated with the respective tasks, and respective file sizes of the respective files. In some examples, operation 806 can be implemented in a similar manner as operation 608 of FIG. 6.

After operation 806, process flow 800 moves to operation 808.

Operation 808 depicts determining a mean time to transfer a byte based on the respective amounts of time spent backing up the respective files, and the respective file sizes. In some examples, operation 808 can be implemented in a similar manner as operation 610 of FIG. 6.

After operation 808, process flow 800 moves to operation 810.

Operation 810 depicts determining an approximate time of completing the backup based on the mean time to transfer a byte and the number of changed bytes. In some examples, operation 810 can be implemented in a similar manner as operation 612 of FIG. 6.

In some examples, operation 810 comprises, while performing the backup, performing iterations of updating the approximate time of completing the backup based on determining a total number of bytes remaining to transfer as part of the backup. That is, as a job progresses, the ETA can be updated.

In some examples, operation 810 comprises, while performing the backup, performing iterations of updating the approximate time of completing the backup based on determining respective mean times to transfer a byte. That is, as a job progresses, a MTT value (in operation 810) can be updated, and this information can be used to update ETA.

After operation 810, process flow 800 moves to operation 812.

Operation 812 depicts storing an indication of the approximate time of completing the backup. In some examples, operation 812 can be implemented in a similar manner as operation 614 of FIG. 6.

In some examples, operation 812 comprises setting the number of changed bytes to zero after completing the backup. That is, where a backup has completed, it can be that there are no changed bytes between the source data set and the latest backup, so TBTT can be set to zero to reflect this.

After operation 812, process flow 800 moves to 814, where process flow 800 ends.

FIG. 9 illustrates an example process flow 900 that can facilitate data transfer time estimation, in accordance with an embodiment of this disclosure. In some examples, one or more embodiments of process flow 900 can be implemented by data transfer time estimation component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 300 of FIG. 3, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts, based on performing a file operation on a file path, and based on determining that the backup path comprises a substring of the file path, increasing the number of changed bytes by a data size associated with the file operation. That is, a file operation can be associated with a file path. Where a file operation's file path identifies a backup path, a database entry can be made against the backup path that identifies a size of data affected by the file operation.

After operation 904, process flow 900 moves to operation 906.

Operation 906 depicts, wherein the file operation is a first file operation, wherein the file path is a first file path, wherein the data size is a first data size, and based on performing a second file operation on the file path or a second file path, wherein the file operation is to delete a file, refraining from modifying the number of changed bytes by a second data size associated with the file operation. That is, it can be a delete file operation is not reflected with a change to backup path's TBTT, because while it can involve backup work being performed, it can be that the amount of data is small enough to not meaningfully affect an ETA determination.

After operation 906, process flow 900 moves to operation 908.

Operation 908 depicts, wherein the file operation is a first file operation, wherein the file path is a first file path, wherein the data size is a first data size, and based on performing a second file operation on the file path or a second file path, wherein the file operation is to perform a metadata update on a file, refraining from modifying the number of changed bytes by a second data size associated with the file operation. That is, it can be a metadata file operation is not reflected with a change to backup path's TBTT, because while it can involve backup work being performed, it can be that the amount of data is small enough to not meaningfully affect an ETA determination.

After operation 908, process flow 900 moves to 910, where process flow 900 ends.

Figure 10:
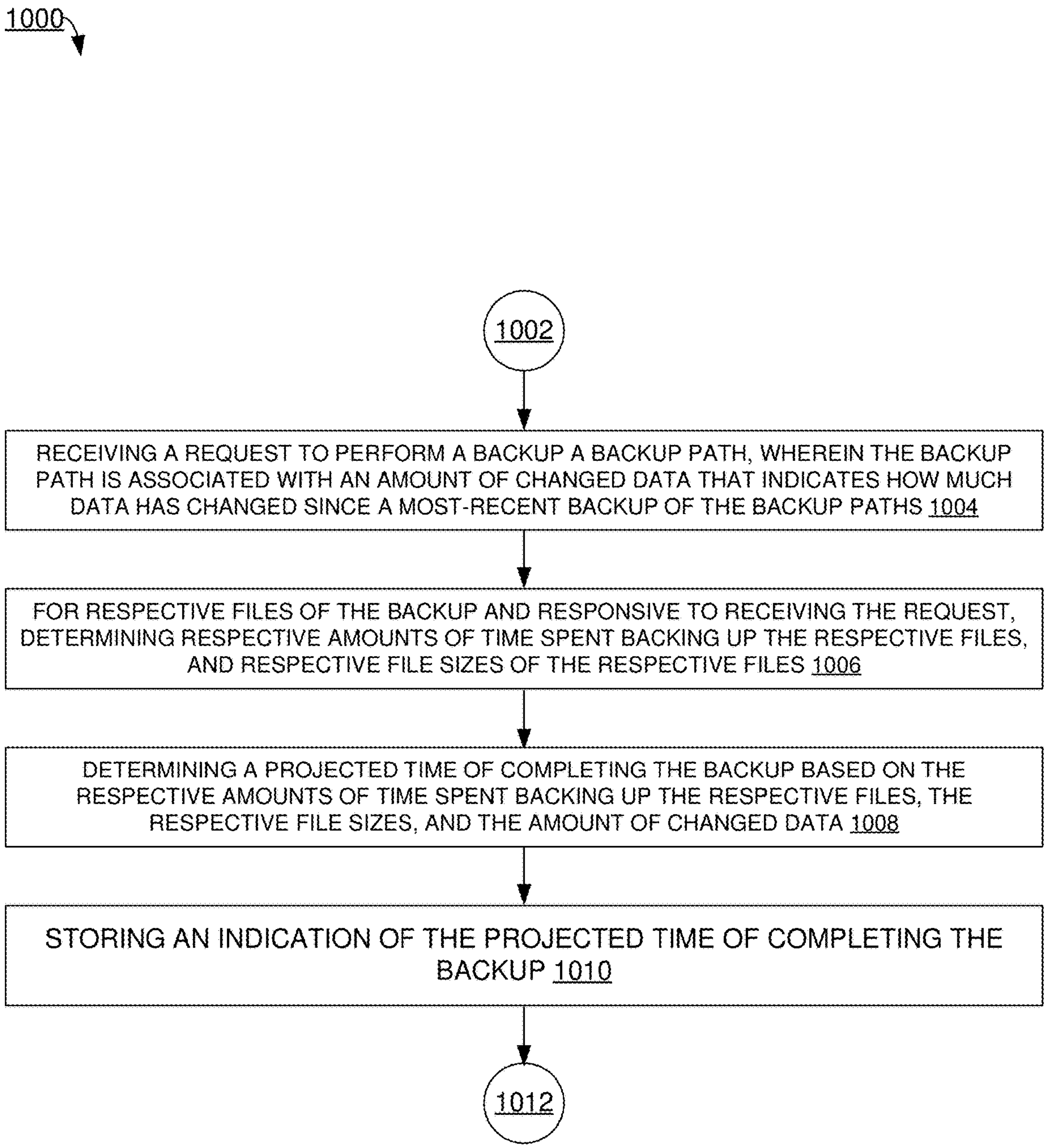
FIG. 10 illustrates another example process flow that can facilitate data transfer time estimation, in accordance with an embodiment of this disclosure.

FIG. 10 illustrates an example process flow 1000 that can facilitate data transfer time estimation, in accordance with an embodiment of this disclosure. In some examples, one or more embodiments of process flow 1000 can be implemented by data transfer time estimation component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 300 of FIG. 3, process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts receiving a request to perform a backup a backup path, wherein the backup path is associated with an amount of changed data that indicates how much data has changed since a most-recent backup of the backup paths. In some examples, operation 1004 can be implemented in a similar manner as operation 606 of FIG. 6.

In some examples, the amount of changed data indicates an amount of data to transfer when the backup of the backup path is performed in further response to the request. In some examples, the amount of changed data differs from a total amount of data stored in the backup path. That is, TBTT can indicate how much data is going to be backed up as part of performing a backup on a file path.

After operation 1004, process flow 1000 moves to operation 1006.

Operation 1006 depicts, for respective files of the backup and responsive to receiving the request, determining respective amounts of time spent backing up the respective files, and respective file sizes of the respective files. In some examples, operation 1006 can be implemented in a similar manner as operation 608 of FIG. 6.

After operation 1006, process flow 1000 moves to operation 1008.

Operation 1008 depicts determining a projected time of completing the backup based on the respective amounts of time spent backing up the respective files, the respective file sizes, and the amount of changed data. In some examples, operation 1008 can be implemented in a similar manner as operation 612 of FIG. 6.

In some examples, the determining of the projected time of completing the backup is performed in a constant amount of time. That is, according to the present techniques, determining the ETA can take approximately the same amount of time regardless of how big the data set to backup is. Where ETA is determined based on a MTT from historical jobs and TBTT, this determination (MTT*TBTT) can be made in a constant amount of time. This can be performed in contrast to walking through a directory path after performing a difference of backup snapshots, and then determining ETA from that.

After operation 1008, process flow 1000 moves to operation 1010.

Operation 1010 depicts storing an indication of the projected time of completing the backup. In some examples, operation 1010 can be implemented in a similar manner as operation 614 of FIG. 6.

In some examples, operation 1110 comprises, in response to the request, performing the backup as a function of the projected time, wherein the indication is a first indication, wherein performing the backup comprises creating a dataset for the backup path, wherein a second indication of the amount of changed data is added to metadata of the dataset, and wherein the determining of the projected time of completing the backup is performed based on the second indication of the amount of changed data. That is, it can be that, whenever a dataset is created, the TBTT for the basepath can be read from the database and added to the metadata of the dataset. After this, the TBTT in the database for the basepath can be marked as 0.

After operation 1010, process flow 1000 moves to 1012, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of source computer 102 and/or target computer 106.

In some examples, computing environment 1100 can implement one or more embodiments of the process flows of FIGS. 2-3 and/or 6-10 to facilitate data transfer time estimation.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

maintaining respective numbers of changed bytes for respective backup paths of a file system, wherein the respective numbers of changed bytes indicate how many bytes have changed since respective most-recent backups of the respective backup paths, wherein the respective backup paths are stored in a data store;

based on a backup policy being created, wherein the backup policy identifies the backup path, and based on determining that the backup path does not exist in the data store, creating an entry in the data store that corresponds to the backup path, and causing a protocol driver to perform file system operations on the file system to refresh an in-memory data structure that represents the respective backup paths;

based on performing a file operation on a file path, and based on determining that a backup path of the respective backup paths comprises a substring of the file path, increasing a number of changed bytes of the respective numbers of changed bytes by an amount of data modified as a result of performing the file operation, wherein the backup path is associated with the number of changed bytes; and while performing a backup of the backup path, for respective tasks of the backup, determining respective amounts of time spent backing up respective files associated with the respective tasks, and respective file sizes of the respective files, determining a mean time to transfer a byte based on the respective amounts of time spent backing up the respective files, and the respective file sizes, determining an estimated time of completing the backup based on the mean time to transfer a byte and the number of changed bytes, and storing an indication of the estimated time of completing the backup.

2. The system of claim 1, wherein causing the protocol driver to perform file system operations on the file system to refresh the in-memory data structure that represents the respective backup paths is performed based on sending a signal hang up message to the protocol driver.

3. The system of claim 1, wherein the backup policy is a first backup policy, and wherein the operations further comprise:

based on creation of a second backup policy that identifies a second backup path, and based on determining that the second backup path exists in the data store, refraining from causing a protocol driver to perform file system operations on the file system to refresh an in-memory data structure that represents the respective backup paths.

4. The system of claim 1, wherein the operations further comprise:

based on determining that an exit callback of a file operation indicates that the file operation was unsuccessful, refraining from updating the respective numbers of changed bytes for the respective backup paths.

5. The system of claim 1, wherein the operations further comprise:

based on determining that an exit callback of a file operation indicates that the file operation was successful, and based on determining that the file operation omits a reference to any of the respective backup paths, refraining from updating the respective numbers of changed bytes for the respective backup paths.

6. The system of claim 1, wherein the operations further comprise:

based on determining that an exit callback of a file operation indicates that the file operation was successful, and based on determining that the file operation identifies the backup path of the respective backup paths, updating the number of changed bytes that corresponds to the backup path.

7. A method, comprising:

performing, by a system comprising at least one processor, a backup of a backup path, wherein the backup path is associated with a number of changed bytes that indicates how many bytes have changed since a most-recent backup of the backup path, and wherein the backup path is stored in a data store;

based on a backup policy being created, wherein the backup policy identifies the backup path, and based on determining that the backup path does not exist in the data store, creating, by the system an entry in the data store that corresponds to the backup path, and causing, by the system, a protocol driver to performs file system operations on the file system to refresh an in-memory data structure that represents the backup path;

based on performing a file operation on a file path, and based on determining that the backup path comprises a substring of the file path, increasing, by the system, the number of changed bytes by an amount of data modified as a result of performing the file operation;

for respective tasks of the backup, determining, by the system, respective amounts of time spent backing up respective files associated with the respective tasks, and respective file sizes of the respective files;

determining, by the system, a mean time to transfer a byte based on the respective amounts of time spent backing up the respective files, and the respective file sizes;

determining, by the system, an approximate time of completing the backup based on the mean time to transfer a byte and the number of changed bytes; and storing, by the system, an indication of the approximate time of completing the backup.

8. The method of claim 7, further comprising:

setting, by the system, the number of changed bytes to zero after completing the backup.

9. The method of claim 7, wherein the file operation is a first file operation, wherein the file path is a first file path, and further comprising:

based on performing a second file operation on the file path or a second file path, wherein the file operation is to delete a file, refraining from modifying the number of changed bytes based on the performing of the second file operation.

10. The method of claim 7, wherein the file operation is a first file operation, wherein the file path is a first file path, wherein the data size is a first data size, and further comprising:

based on performing a second file operation on the file path or a second file path, wherein the file operation is to perform a metadata update on a file, refraining from modifying the number of changed bytes based on the performing of the second file operation.

11. The method of claim 7, further comprising:

creating, by the system, a stored value that indicates the number of changed bytes before determining to perform the backup.

12. The method of claim 7, further comprising:

while performing the backup, performing, by the system, iterations of updating the approximate time of completing the backup based on determining a total number of bytes remaining to transfer as part of the backup.

13. The method of claim 7, further comprising:

while performing the backup, performing, by the system, iterations of updating the approximate time of completing the backup based on determining respective mean times to transfer a byte.

14. A non-transitory computer-readable medium comprising instructions that, in response to execution, cause a system comprising at least one processor to perform operations, comprising:

receiving a request to perform a backup a backup path, wherein the backup path is associated with an amount of changed data that indicates how much data has changed since a most-recent backup of the backup path, and wherein the backup path is stored in a data store;

based on a backup policy being created, wherein the backup policy identifies the backup path, and based on determining that the backup path does not exist in the data store, creating an entry in the data store that corresponds to the backup path, and causing a protocol driver to perform file system operations on the file system to refresh an in-memory data structure that represents the backup path;

based on performing a file operation on a file path, and based on determining that the backup path comprises a substring of the file path, increasing the number of changed bytes by an amount of data modified as a result of performing the file operation;

for respective files of the backup and responsive to receiving the request, determining respective amounts of time spent backing up the respective files, and respective file sizes of the respective files;

determining a projected time of completing the backup based on the respective amounts of time spent backing up the respective files, the respective file sizes, and the amount of changed data; and storing an indication of the projected time of completing the backup.

15. The non-transitory computer-readable medium of claim 14, wherein the determining of the projected time of completing the backup is performed in a constant amount of time.

16. The non-transitory computer-readable medium of claim 14, wherein the amount of changed data indicates an amount of data to transfer when the backup of the backup path is performed in further response to the request.

17. The non-transitory computer-readable medium of claim 14, wherein the amount of changed data differs from a total amount of data stored in the backup path.

18. The non-transitory computer-readable medium of claim 14, wherein the operations further comprise, in response to the request, performing the backup as a function of the projected time, wherein the indication is a first indication, wherein performing the backup comprises creating a dataset for the backup path, wherein a second indication of the amount of changed data is added to metadata of the dataset, and wherein the determining of the projected time of completing the backup is performed based on the second indication of the amount of changed data.

19. The method of claim 7, wherein the backup policy is a first backup policy, and further comprising:

based on creation of a second backup policy that identifies a second backup path, and based on determining that the second backup path exists in the data store, refraining, by the system, from causing a protocol driver to perform file system operations on the file system to refresh an in-memory data structure that represents the respective backup paths.

20. The non-transitory computer-readable medium of claim 14, wherein the backup policy is a first backup policy, and wherein the operations further comprise:

based on creation of a second backup policy that identifies a second backup path, and based on determining that the second backup path exists in the data store, refraining from causing a protocol driver to perform file system operations on the file system to refresh an in-memory data structure that represents the respective backup paths.

* * * * *